Jan. 9, 1934.    J. T. LEACH    1,942,558
APPARATUS FOR TIERING STRIPS
Filed Oct. 7, 1932    2 Sheets-Sheet 1
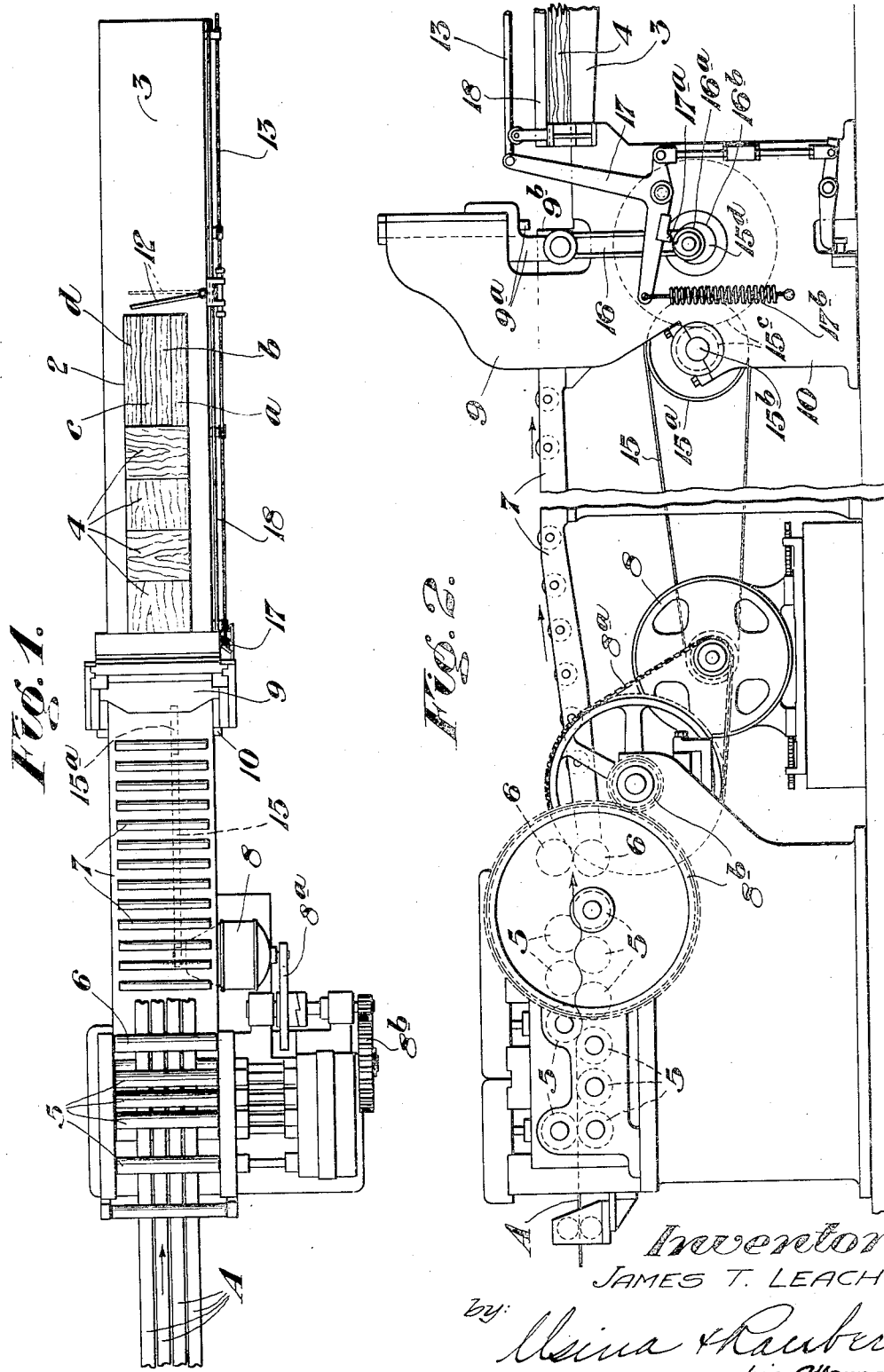
Inventor:
JAMES T. LEACH,
by Usina & Rauber
his Attorneys.

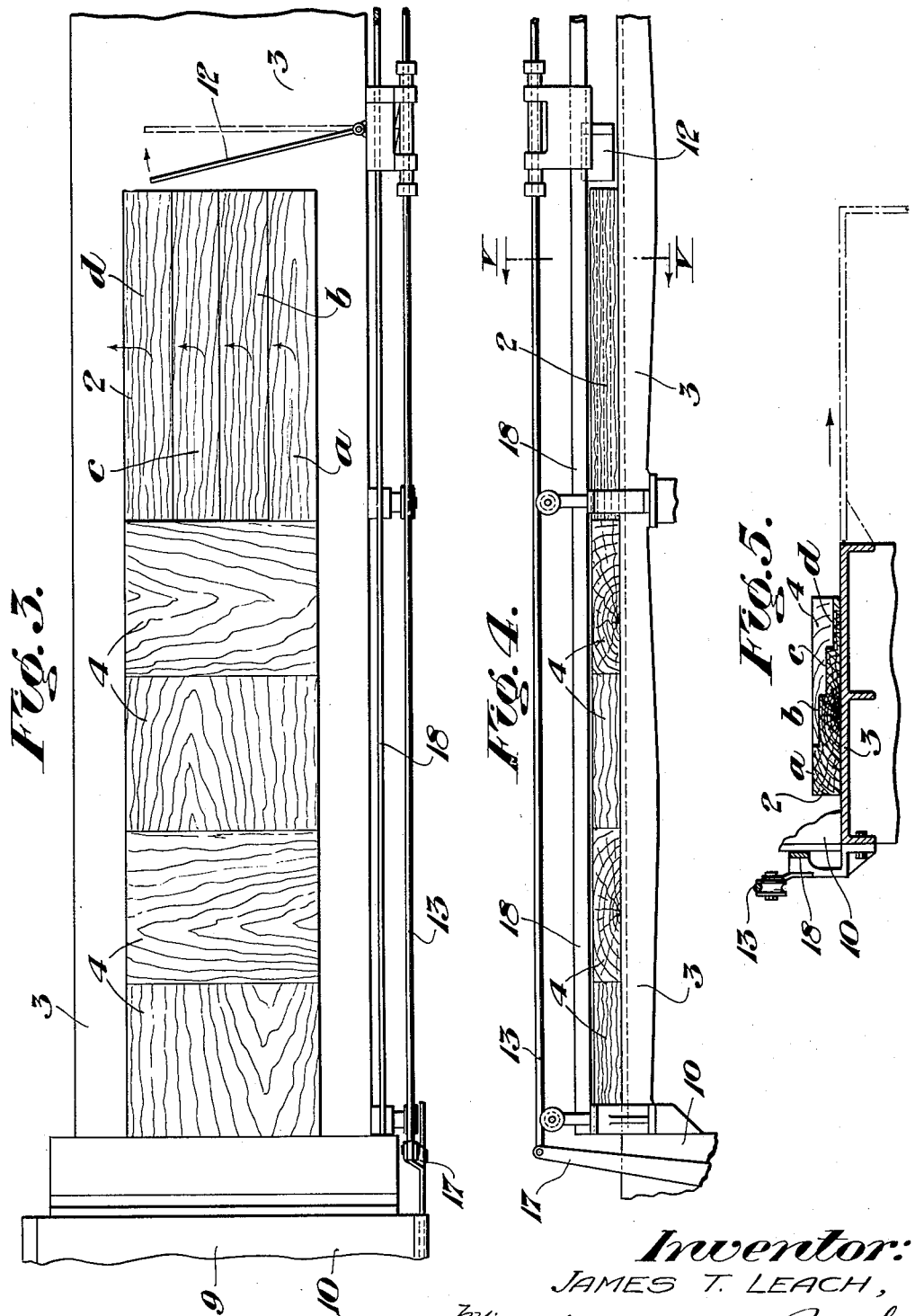

Patented Jan. 9, 1934

1,942,558

UNITED STATES PATENT OFFICE 1,942,558

APPARATUS FOR TIERING STRIPS

James T. Leach, Cleveland, Ohio

Application October 7, 1932. Serial No. 636,743

6 Claims. (Cl. 164—59)

This invention relates to improvements in apparatus for tiering strips and more particularly to rolled metal strips, and is shown in a preferred embodiment as used in connection with a conventional leveling machine, shear and shear table.

An object of the invention is to provide means enabling the precise and continuous shearing of a plurality of metal strips. Another object is to provide a novel method and apparatus enabling the rapid handling of the strips after they have been sheared into predetermined lengths.

The foregoing and other objects of my invention will be made more apparent from the following disclosure.

In the drawings:

Figure 1 is a top plan view of my invention as used in connection with a conventional form of metal strip shearing device.

Figure 2 is an enlarged side elevation of Figure 1.

Figure 3 is a plan view showing the relationship of my improved tiering device with its associated spacing elements.

Figure 4 is a side elevation of Figure 3.

Figure 5 is an end view thereof.

In the drawings, the numeral 2 indicates a stepped block providing a plurality of different horizontal planes, as at $a$, $b$, $c$ and $d$. The stepped block 2 is shown mounted transversely of a shearing table 3, over which a plurality of strips in side-by-side relationship are to be fed. On the shearing table 3 there is disposed a plurality of spacer or filler blocks 4, of the same thickness as the thickest portion $a$ of the stepped block 2, for the purpose of spacing the stepped block a predetermined distance from the end of the shearing table 3.

The table 3 is closely associated with a combined leveling and shearing machine of conventional design, which comprises a plurality of rolls 5 which provide a tortuous path for a plurality of metal strips A which are fed into the machine in the same horizontal plane, and are shown in the drawings as being four in number. Rolls 6 are provided at the end of the tortuous path rolls for the purpose of straightening the strips before they are fed to the closely adjacent conveyer table 7. A motor 8 and suitable drive mechanism $8^b$, which is shown as comprising a gear train, are connected by means of a belt or chain $8^a$ for driving the two series of rolls 5 and 6, respectively. At the end of the conveyer table 7 a shear 9 is positioned for cutting the strips into predetermined lengths. The shear 9 is shown as comprising upper and lower cutting elements $9^a$ and $9^b$, respectively. The upper cutting element $9^a$ reciprocates vertically in guides provided in its supporting stand 10.

The motor 8, which rotates the rolls 5 and 6, is also used to operate the shear 9. This is done by means of a belt or chain 15 which rotates a pulley $15^a$ on a shaft $15^b$, the latter being mounted in bearings on the stand 10. The pulley $15^a$, through a suitable gear train, generally indicated at $15^c$, rotates a shaft $15^d$ which is provided with an eccentric $16^a$.

This eccentric reciprocates connecting-rod 16 which is operatively connected to the upper cutting element $9^a$. A clutch mechanism $16^b$ is operatively interposed between the eccentric $16^a$ and shaft $15^d$, and is normally held in declutched position by a dog $17^a$ on bell-crank lever 17. This bell-crank lever 17 is pivotally mounted on the stand 10 and is retained in declutching position by means of a spring $17^b$.

Closely adjacent the end of the stepped block 2 there is positioned a trip lever 12 which is adjustably mounted on a bar 18 extending longitudinally of the table 3. This trip lever 12 is connected by means of a rod 13 to the bell-crank lever 17 which releases the clutch, permitting the shear 9 to operate.

In operation, a plurality of strips A, shown in the drawings as being four in number, are fed, side-by-side, into the leveling machine rolls 5 where they are subjected to a tortuous path, indicated by the arrow. Rolls 6 straighten the strips in order that they will lie flatly upon the conveyer table 7 and be fed to the shear 9, where their ends are cropped, and onto the shearing table 3. Here they are moved across the top surface of the spacer blocks 4 which, as before mentioned, are of the same thickness as the thickest portion $a$ of the stepped block 2.

One of the strips A will be fed across the thickest surface $a$ of the stepped block. The three remaining strips will simultaneously be fed onto the remaining steps $b$, $c$ and $d$ of correspondingly lesser thicknesses. It will be seen that the four strips on the stepped block are now arranged in different horizontal transverse planes with respect to the shear table 3. The spacer blocks having been arranged for cutting the strips in a predetermined length, as determined from the shear 9, when the ends of the strips simultaneously move over the stepped surfaces of the block 2 and make contact with it, the trip lever 12 will be moved to actuate the bell-crank lever 17, allowing the clutch to operate the shear. The plurality of strips will thus be severed.

The advance ends of the strips can now be brought together in stacked relation by moving them transversely of the length of the shearing table, one onto the other, either manually or otherwise.

The trailing ends of the strips A are piled or assembled in a similar manner.

It is to be understood that the leveling machine, conveyer table, shear and shear table, together with the mechanism enabling their operation are all old, and form no part of the present invention, except in combination with my tiering device and its cooperating spacing means.

While I have shown and described one specific embodiment of my invention it will be understood that I do not wish to be limited thereto, since various modifications may be made without departing from the scope of my invention, as defined in the appended claims.

I claim:

1. Apparatus for tiering strips comprising a shear, a runout table associated with said shear, a stepped block on said runout table for permitting the ends of a plurality of strips to flex into successively different transverse horizontal planes, a trip mechanism adjacent the end of said stepped block for operating said shear and spacing means on said runout table between said stepped block and said shear.

2. The method of shearing a plurality of strips which consists in leveling said strips, feeding said strips in side-by-side relationship to a shear, cropping the ends of said strips and feeding them a predetermined distance to a tiered block and simultaneously shearing the plurality of strips while their advance ends are in different transverse horizontal planes.

3. The method of handling a plurality of strips which consists in assembling them in side-by-side relationship in different transverse horizontal planes, shearing said strips simultaneously and piling the same by successively moving each strip transversely onto its next lower adjacent strip.

4. The method of handling a plurality of strips in side-by-side relationship which consists in arranging their advance ends in different transverse horizontal planes, simultaneously shearing the said strips into a predetermined length, moving the advance ends of each strip transversely onto its next lower adjacent strip and moving the trailing ends of each successive strip into corresponding position.

5. Apparatus for shearing strips comprising means for feeding strips through a shear and onto a table and a series of steps on said table for supporting said strips at different horizontal elevations with respect to the width of said table.

6. Apparatus for shearing strips comprising a shear, a table associated with said shear, spacing elements on said table, a stepped block at the end of said spacing elements providing means for supporting said strips in different relative horizontal planes, and means adjacent said stepped block for controlling the operation of said shear.

JAMES T. LEACH.